United States Patent [19]

Tanaka et al.

[11] Patent Number: 4,499,496
[45] Date of Patent: Feb. 12, 1985

[54] SOLID STATE IMAGE SENSING DEVICE

[75] Inventors: Nobuyoshi Tanaka, Yokohama; Takao Kinoshita, Tokyo, both of Japan

[73] Assignee: Canon Kabushiki Kaisha, Tokyo, Japan

[21] Appl. No.: 390,055

[22] Filed: Jun. 18, 1982

[30] Foreign Application Priority Data

Sep. 17, 1981 [JP] Japan .................................. 56-146585
Sep. 17, 1981 [JP] Japan .................................. 56-146586

[51] Int. Cl.³ .............................................. H04N 3/14
[52] U.S. Cl. .................................................. 358/213
[58] Field of Search ........................ 358/213, 212, 44; 357/24, 30; 250/211 J, 578

[56] References Cited

U.S. PATENT DOCUMENTS

| 3,932,775 | 1/1976 | Kosonocky | 307/311 |
| 4,229,752 | 10/1980 | Hynecek . | |
| 4,237,383 | 12/1980 | Kosonocky | 358/213 |
| 4,263,623 | 4/1981 | Woo et al. | 358/213 |
| 4,319,279 | 3/1982 | Bergen | 358/213 |

FOREIGN PATENT DOCUMENTS

| 1395025 | 5/1975 | United Kingdom . |
| 1529489 | 10/1978 | United Kingdom . |
| 2039697A | 8/1980 | United Kingdom . |

OTHER PUBLICATIONS

Interlacing in Charge-Coupled Imaging Devices, IEEE Transactions on Electron Devices, Jun. 1973, Carlo H. Sequin.
Article by Tsukamoto Tetsuo titled "Fundamental of CCD and Applications Thereof" in Electronics Magazine, (Apr. 1977), vol. 22, No. 4, pp. 365-371.

Primary Examiner—Michael A. Masinick
Attorney, Agent, or Firm—Fitzpatrick, Cella, Harper & Scinto

[57] ABSTRACT

A radiation sensing device includes radiation sensor for generating an electrical indication indicative of the distribution pattern of received radiation, a storing device for storing the electrical indication generated by the sensor, and a read-out device for reading out the stored electrical indication from the storing device. The sensor includes a first plurality of sensing elements, while the storing device includes a second plurality of storage elements. The second plurality is fewer than the first plurality.

26 Claims, 14 Drawing Figures

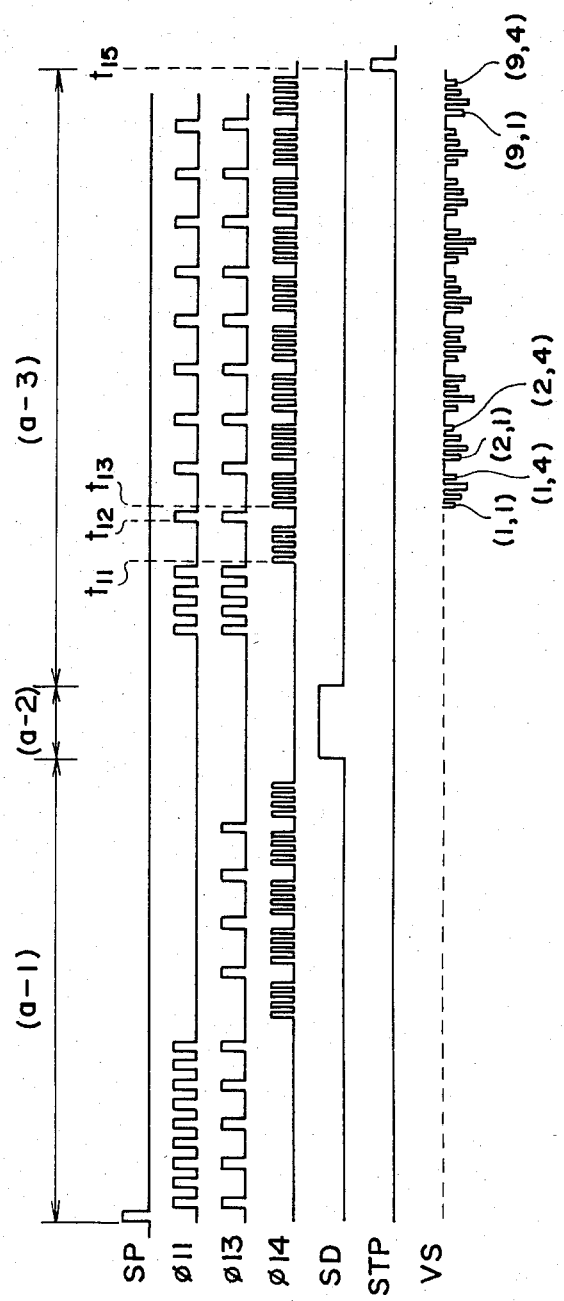

FIG. 10
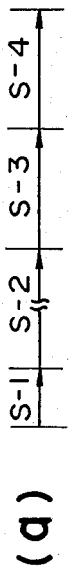
(a)
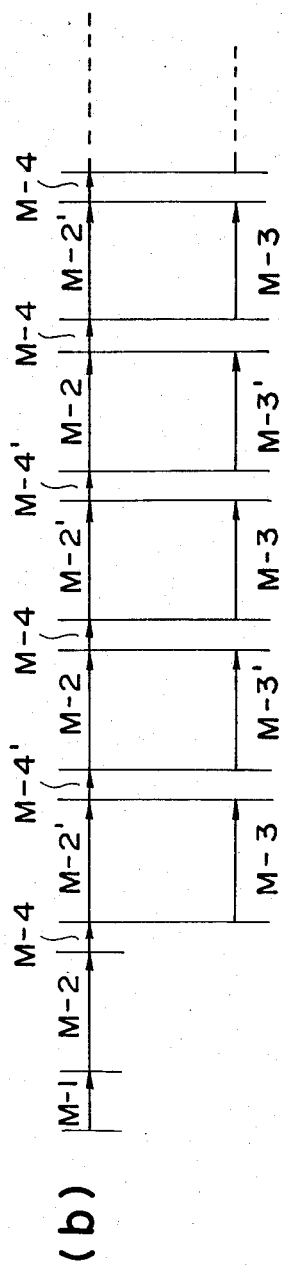
(b)

SOLID STATE IMAGE SENSING DEVICE

BACKGROUND OF THE INVENTION
1. Field of the Invention

This invention relates to a solid state image sensing device for image sensing.

2. Description of the Prior Art

In a frame transfer type area (two-dimensional) sensor, the number of cells in the longitudinal direction of the image sensing portion has been 245, namely, about one-half of the number of scanning lines, in the case of NTSC system, and the number of picture elements which can be stored in each cell at a time has been 245 which corresponds to one field because each cell has been provided with the functions of photosensing and transfer, and images corresponding to one field have been obtained by effecting an interlace operation which comprises reading out a signal charge corresponding to the one field, thereafter effecting image sensing by moving the effective photosensitive area of each cell, and subsequently reading out the amount corresponding to the one field.

Such a system matches the NTSC television system very well and is characterized by its ability to provide an image of excellent resolution in spite of the small number of cells.

On the other hand, in recent years, studies and developments have been carried out for sensing images by using an image sensing device such as CCD instead of the conventional silver salt film known as the video still camera or the video photography and magnetically recording the sensed images. Where the conventional frame transfer type area sensor is used in such a system, there is the disadvantage that if an attempt is made to record one frame to obtain a high quality of image, the resultant image comprises two fields deviated a little from each other in time, or deviated from each other by 1/60 sec. in terms of TV signal rate and when the image of a moving object is sensed, there is only obtained an unsightly image and if one-field recording is adopted to avoid such a phenomenon, the resolution in vertical direction is reduced to about one-half.

SUMMARY OF THE INVENTION

In view of the above-noted disadvantage peculiar to the prior art, it is an object of the present invention to provide a solid state image sensing device suitable for a video still camera.

It is another object of the present invention to provide a solid state image sensing device which can provide a frame signal comprising a plurality of field signals from images sensed at the same point of time.

It is still another object of the present invention to provide a solid state image sensing device which can be used for both photographing stationary images and photographing moving images.

It is yet another object of the present invention to provide a solid state image sensing device suitable for photographing moving images and which can provide a field signal of high resolution.

Other objects of the present invention will become apparent from the following detailed description and the accompanying drawings.

BRIEF DESCRIPTION OF THE DRAWINGS

FIG. 6A is a timing chart of the various portions of FIG. 5 during the photographing of a stationary image.

FIG. 10 shows the sequence when the second embodiment is used to photograph a stationary image and the sequence when the second embodiment is used to photograph a moving image.

DESCRIPTION OF THE PREFERRED EMBODIMENTS

Figure 1:
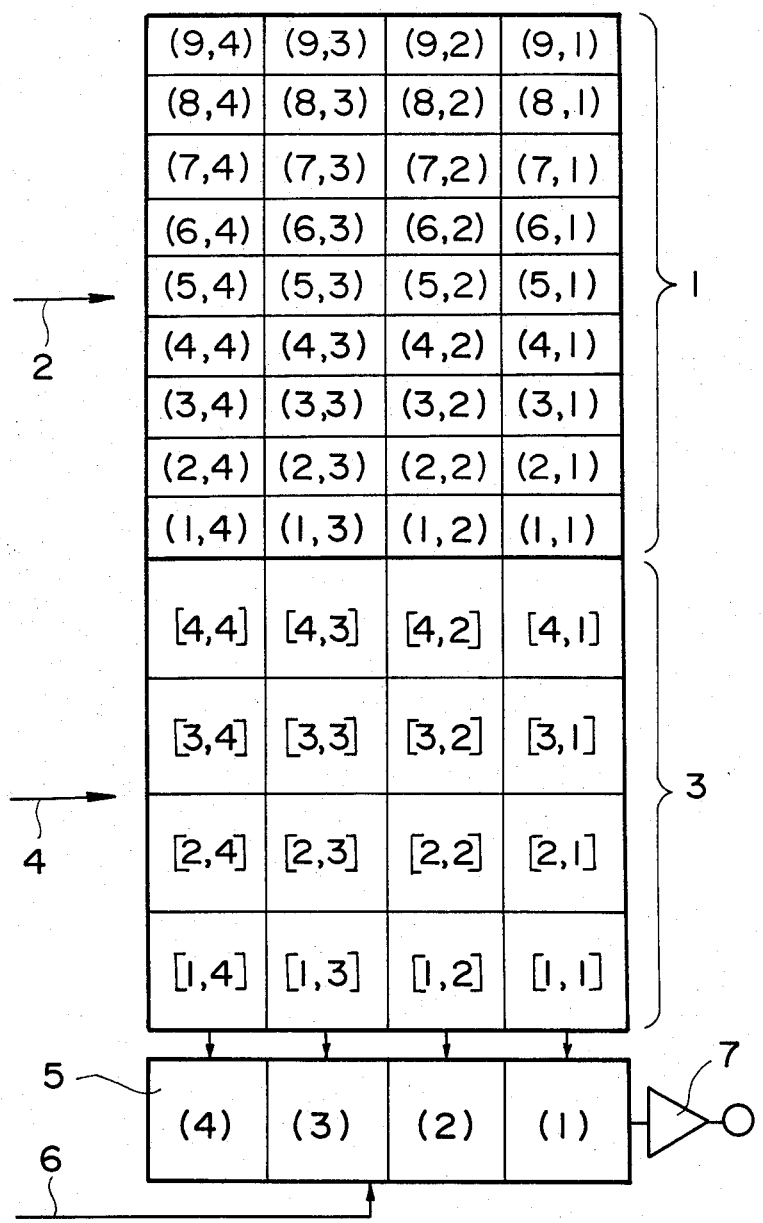
FIG. 1 schematically shows the construction of a frame transfer type CCD according to a first embodiment of the present invention.

The invention will hereinafter be described with respect to some embodiments thereof by reference to the drawings. FIG. 1 shows the construction of a frame transfer type CCD according to a first embodiment of the present invention. In FIG. 1, reference numeral 1 designates the image sensing portion of the frame transfer type CCD. In this image sensing portion, for example, in the case of the NTSC system, the number of cells in the vertical direction is set to a number substantially equal to the number of scanning lines, namely, on the order of 490. That is, this CCD has a number of cells about twice that in the conventional frame transfer type CCD. As the number of cells in horizontal direction, a number on the order of 390, 570 or 780 which corresponds to the color sub-carrier frequency is usually adopted. Of these cells, none elements in the vertical direction and four elements in the horizontal direction are shown in FIG. 1. Reference numeral 2 designates an electrode for applying to this image sensing portion a voltage for effecting light reception and transfer. Reference numeral 3 denotes a storing portion, in which the number of cells in the vertical direction is about ½ of that in the image sensing portion and the number of cells in the horizontal direction is equal to that in the image sensing portion. Accordingly, this storing portion comprises a number of cells substantially equal to that in the conventional frame transfer type CCD. Reference numeral 4 designates an electrode to which a voltage for transferring a charge is applied. Reference numeral 5 denotes a horizontal transfer register which is constructed as a row of charge transfer portion comprising a number of cells substantially equal to the number of cells in the horizontal direction of the image sensing portion or the storing portion. Designated by 6 is an electrode for applying a voltage for transferring the charge of the horizontal transfer register 5. Denoted by 7 is an amplifier for converting the charge transferred from the horizontal register 5 into a voltage output.

There are several charge transfer methods such as single phase drive, two-phase drive, three-phase drive, four-phase drive, etc., and any of these methods may be adopted in the construction of the CCD of the present invention, and the single phase drive method may be that described, for example, in U.S. Pat. No. 4,229,752.

Figure 2:
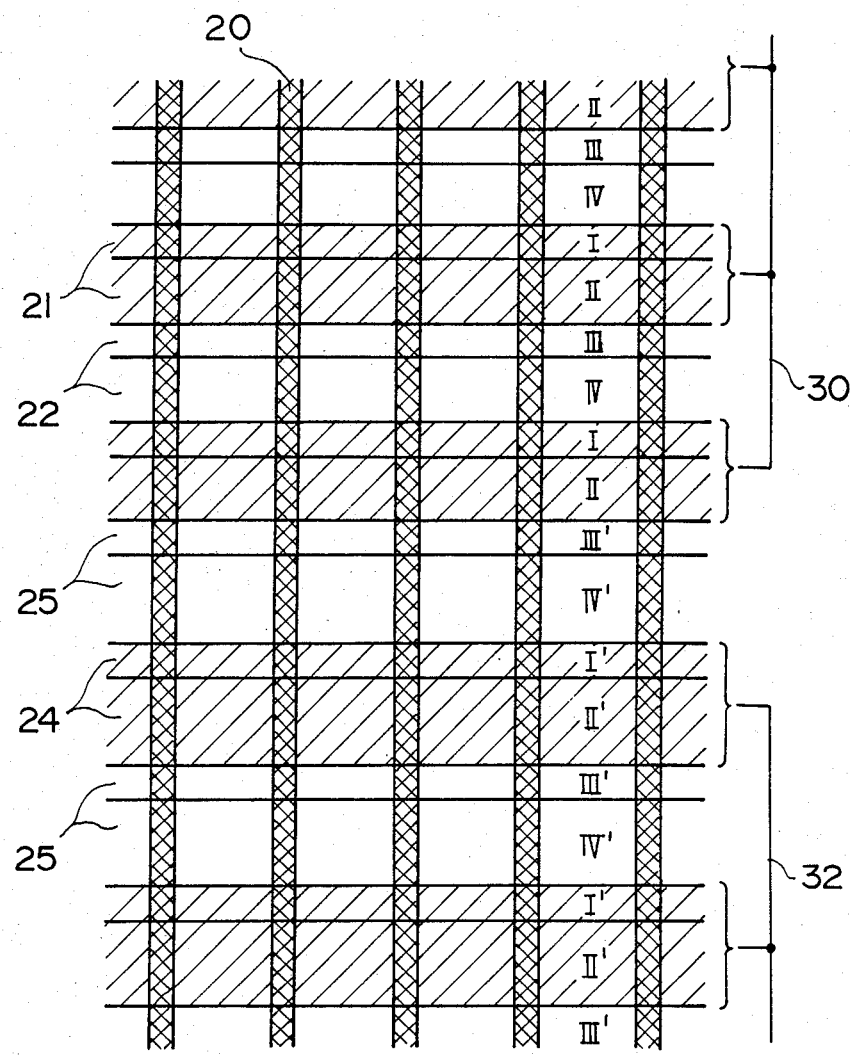
FIG. 2 is a schematic view of a portion of the CCD according to the first embodiment.

FIG. 2 is a schematic plan view of the image sensing device according to the present invention. In FIG. 2, reference numeral 20 designates channel stoppers for preventing leakage of charge between the cells in the horizontal direction, and hatched portion 21 designated the poly-silicon electrode of the image sensing portion, this electrode comprising a first area (I) and a second area (II) which differ from each other in the potential condition in the silicon. Reference numeral 22 denotes a virtual electrode formed in the silicon, and it forms in the silicon a third area (III) and a fourth area (IV) which differ from each other in the potential condition. The first to fourth areas constitute a cell in the vertical direction. 24 and 25 are constructed similarly to 21 and 22, respectively, of the image sensing portion. However, the amounts of charge stored in 24 and 25 are about twice those stored in 21 and 25.

Figure 3:
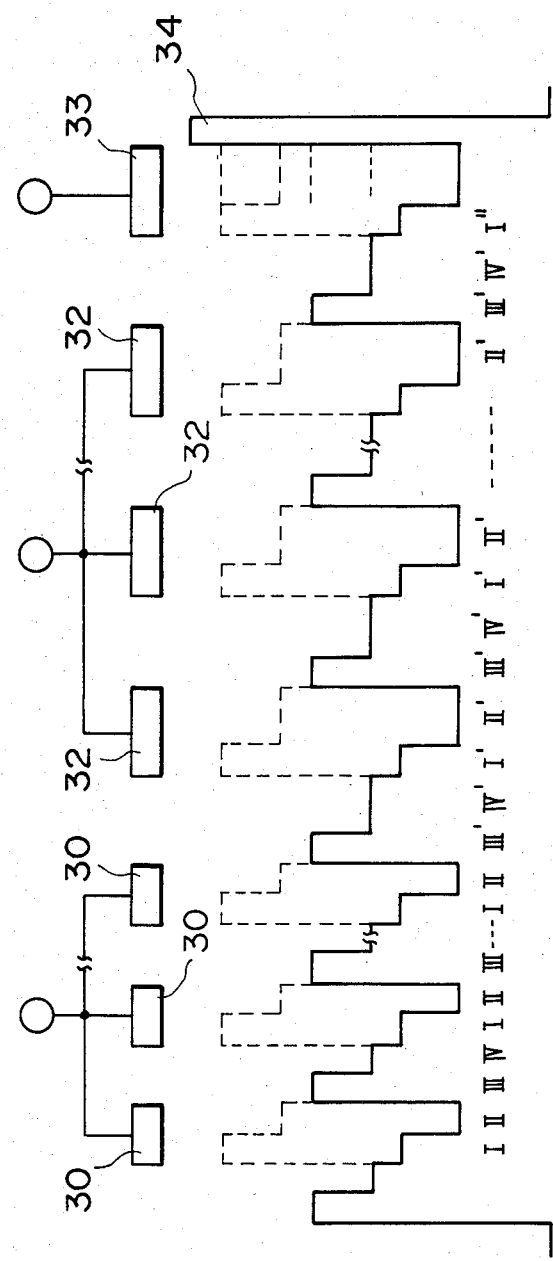
FIG. 3 shows the condition of the interior potential of the CCD according to the first embodiment.

FIG. 3 shows the interior potential condition of the CCD of the construction shown in FIG. 2. Reference numerals 30 designate the poly-silicon electrodes of the image sensing portion which correspond to 21 in FIG. 2. All of the poly-silicon electrodes of the image sensing portion are commonly connected and a voltage for charge transfer may be applied thereto. The portion below these poly-silicon electrodes is divided into a first and a second potential area as described in connection with FIG. 2, and the first area (I) is higher in potential condition than the second area (II).

The dotted lines in FIG. 3 indicate the condition in which the poly-silicon electrodes 30 are in a high negative potential, and the solid lines indicate the potential in which the potentials of the poly-silicon electrodes 30 are slighly negative or positive.

The potential of the virtual electrode portion 22 of FIG. 2 is such that as shown in FIG. 3, the third area (III) is slightly higher in potential than the fourth area (IV). The potential of this portion does not depends on the voltage applied to the electrodes 30, but is always maintained constant. Accordingly, if a predetermined voltage is applied to the poly-silicon electrodes, charge will be stored and the charge will be successively transferred by a pulse-like voltage being applied.

In FIG. 3, reference numerals 32 denote the poly-silicon electrodes of the storing portion. The interior potential of this storing portion is formed substantially similarly to that of the image sensing portion.

The first to fourth areas of the storing portion are designated as I', II', III' and IV' correspondingly to the first to fourth areas of the potential of the image sensing portion.

In FIG. 3, reference numeral 33 designates a horizontal transfer register, one side of which is closed by a channel stopper. In FIG. 3, reference numeral 34 indicates the potential condition of the channel stopper portion.

Movement of charge will now be described by reference to FIGS. 1 to 3.

The charge stored in the image sensing portion is transferred by a pulse voltage being applied to the polysilicon electrodes 30 and enters the fourth potential area of 25 in FIGS. 2. If, at this time, a slightly negative or positive potential is applied to the poly-silicon electrodes 30, the potential condition indicated by the solid lines of FIG. 3 is brought about and the charge in the fourth area enters the second area through the first area. When a negative high potential is then applied to the electrodes 30, the charge in the second area (II) is transferred to the area IV' through the area III'. When, at this time, a slightly negative or positive potential is applied to the poly-silicon electrodes 32 of the storing portion, the potentials of the areas I' and II' fall from the area IV' and the charge in the area IV' is transferred to the area II'. When a pulse-like voltage is repetitively applied to the poly-silicon electrodes 32 of the storing portion, the above-described operation is repeated and the charge transferred to the storing portion is transferred to the horizontal transfer register. Then, also in the horizontal transfer register, the charge is read out by a similar operation. The construction of the horizontal transfer register is substantially similar to a transfer register designated by 123 in FIG. 8, but the vertical direction thereof is closed by a channel stopper so that transfer takes place only in the horizontal direction.

Figure 4:
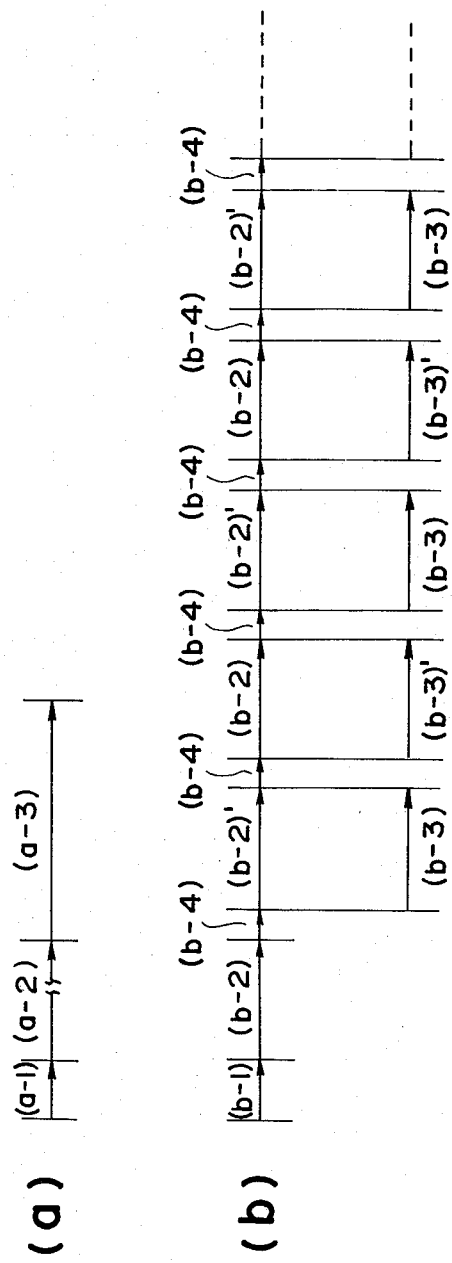
FIG. 4 shows the sequence when the first embodiment is used to photograph a stationary image and the sequence when the first embodiment is used to photograph a moving image.

Reference is now had to FIGS. 4(a) and (b) to describe the operation when the device of the present invention is operated as an actual camera. FIG. 4(a) shows the operating condition when the device of the present invention is operated as a video still camera for obtaining a still picture, and FIG. 4(b) shows the condition when the device of the present invention is operated as a conventional video camera for obtaining a continuous picture (moving picture).

The condition (a-1) of FIG. 4(a) shows the all clear condition in which the unwanted charge stored by a dark current or the like immediately before the exposure operation is cleared through an anti-blooming drain or by operating the CCD at a high speed. An unillustrated shutter is then opened, whereupon the condition shifts to the exposure condition, namely, the storing conditiion (a-2) of the image sensing portion 1.

After the shutter has been closed, the condition shifts to condition (a-3) and the stored charges, for example, the signal charges stored in (1,1), (1,2), (1,3) and (1,4) of FIG. 1 are shifted to [4,1], [4,2], [4,3] and [4,4], the signal charges stored in (2,1), (2,2), (2,3) and (2,4) are shifted to (1,1), (1,2), (1,3) and (1,4), and the signal charges stored in the other picture elements are likewise shifted in the vertical direction by an amount corresponding to one cell. This is sequentially repeated, whereby the signal charges can be put out as time-serial signals from the horizontal shift register in the order of (1,1), (1,2), (1,3), (1,4); (2,1), (2,2), (2,3) . . . , (8.3), (8,4); (9,1), (9,2), (9,3), (9,4). In this case, the signal charges can also be transferred at a frequency different from the read-out frequency until the signal charges from (1,1) to (4,4) move from [1,1] to [4,4].

A stationary image signal corresponding to one frame at the same point of time for storing can be obtained by the above-described operation. Description will now be made of the operation when this device is operated as a video camera for usual continuous photography (moving picture). The condition (b-1) of FIG. 4(b) shows the all clear condition corresponding to the operation (a-1) of FIG. 4(a). However, this operation is not indispensable, because in case of a moving picture, even if the signal corresponding to the first field becomes noise, it is merely a part of the whole, and because this portion can also be constructed at the recording apparatus so that it is not used as a recording signal. Also, in this case, the shutter is not necessary, but storage and read-out are repeated alternately. (b-2), (b-2)', . . . show the stored conditions and the prime indicates the second field. That is, the charge stored in (b-2) is read out in (b-3), and the charge stored in (b-2)' is read out in (b-3)'.

The condition (b-4) is that in which the charge stored in the image sensing portion is transferred to the storing portion.

The frame transfer type CCD according to the present invention has 490 cells in the vertical direction of the image sensing portion and 245 cells in the storing portion and therefore, it differs from the conventional frame transfer type CCD in the operation of transferring the charge from the image sensing portion to the storing portion and the interlace method. This operation will be described by reference to FIG. 1.

In the first field, the charges stored in (1,1), (1,2), (1,3) and (1,4) are transferred to [4,1], [4,2], [4,3] and [4,4] of the storing portion 3. Subsequently, the charges in (2,1), (2,2), (2,3) and (2,4) are likewise transferred to [4,1], [4,2], [4,3] and [4,4]. If the apparatus is designed such that at this time, no pulse voltage is applied to the storing portion but the previous voltage remains therein, two rows of the image sensing portion will be added in this cell. Subsequently, the storing portion is transferred by one line, whereafter two lines of the image sensing portion are transferred in the same manner as described previously. When the first field is read out in this manner and thereafter the next field is read out, if the device is operated so that the cells to be added are shifted by one line each, that is, (2,1) and (3,1), (4,1) and (5,1) are added together, there can be obtained a signal interlaced with the previous field.

Figure 5:
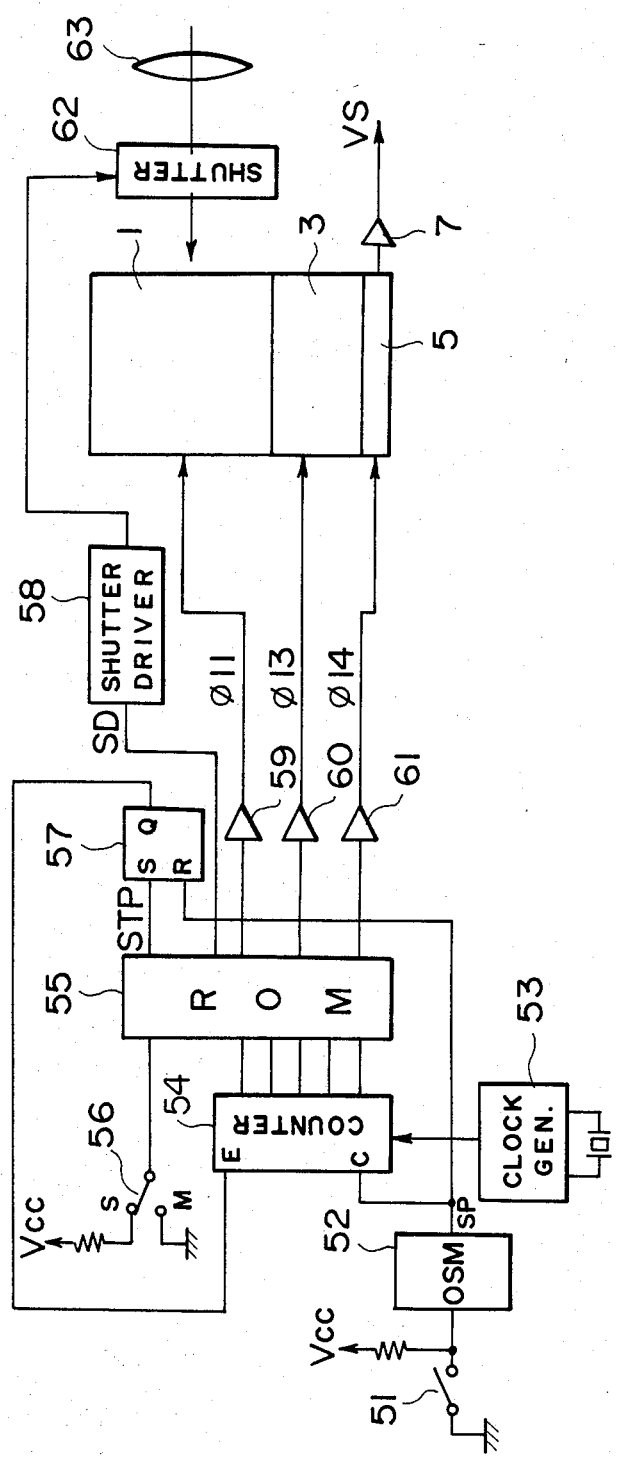
FIG. 5 diagrammatically shows the driving circuit of the CCD according to the first embodiment.
Figure 6B:
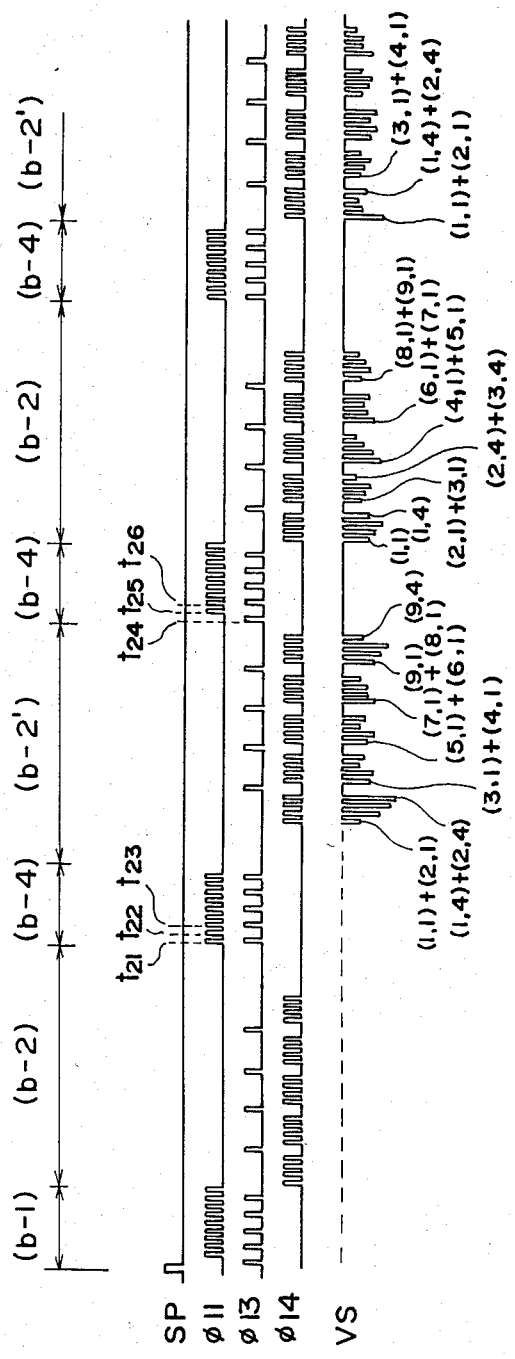
FIG. 6B is a timing chart of the various portions of FIG. 5 during the photographing of a moving image.

The driving circuit of the CCD shown in FIGS. 1-3 is shown in FIG. 5, and timing charts are shown in FIG. 6. FIG. 5 shows an example of the driving circuit of the CCD according to the first embodiment, FIG. 6A shows a timing chart of the various portions of FIG. 5 during the photographing of a stationary image, and FIG. 6B shows a timing chart of the various portions and FIG. 5 during the photographing of a moving image. It is to be understood that when the levels of the clock pulses $\phi_{11}$, $\phi_{13}$ and $\phi_{14}$ of FIGS. 6A and 6B are high, a slightly positive or negative potential is applied to the electrode and that when the levels of these clock pulses are low, a negative potential is applied to the electrode.

In FIG. 5, reference numeral 51 designates a start switch, reference numeral 52 denotes a one-shot multivibrator, reference numeral 53 designates a clock oscillator which generates a clock pulse of a predetermined frequency, reference numeral 54 denotes a counter, and reference numeral 55 designates a ROM which generates pulses $\phi_{11}$, $\phi_{13}$ and $\phi_{14}$ in accordance with the count value of the counter and which is programmed so as to generate the pulse signals shown in FIGS. 6A and 6B. Reference numeral 56 designates a change-over switch for still and movie, reference numeral 57 denotes a set-reset flip-flop, reference numeral 58 designates a shutter driver, reference numerals 59-61 denote CCD drivers, reference numeral 62 designates a shutter, and reference numeral 63 denotes a lens.

When the start switch 51 is depressed, the vibrator 52 generates a pulse and clears the content of the counter 54. The counter 54 effects count-up operation in accordance with the clock pulse from the clock oscillator 53. The count value of the counter 54 is applied as input to ROM 55, which puts out to the shutter driver 58 and CCD drivers 59-61 a signal corresponding to the mode selected by the switch 56. The ROM 55 puts out a signal following the time chart of FIG. 6A when the switch 56 is connected to a terminal S. The ROM 55 puts out a signal following the time chart of FIG. 6B when the switch 56 is connected to a terminal M. That is, a table for photographing a stationary image and a table for photographing a moving image are contained in the ROM 55. In the case of the photographing of a stationary image, if all the signal charge is once read out, the operation is terminated and therefore, a termination signal STP is put out from the ROM 55 to set the flip-flop 57 and then bring the counter 54 into its DISENABLE condition. In the case of the photographing of moving image, the same read-out operation is repeated as shown in FIG. 6B and therefore, the termination signal STP is not put out.

In FIG. 6, VS designates a video output signal.

The driving of the CCD during the photographing of a stationary image will be described by reference to FIG. 6A. For simplicity, it is to be understood that the image sensing portion of the CCD comprises nine vertical cells and four horizontal cells as shown in FIG. 1. First, the charges stored in the image sensing portion and the storing portion are discharged.

Nine clock pulses $\phi_{11}$ are applied to the electrode of the image sensing portion 1 and all the charge in the image sensing portion is transferred to the storing portion 3. While the nine clock pulses $\phi_{11}$ are being put out, four clock pulses $\phi_{13}$ are applied to the electrode of the storing portion 3 and the dark current component in the storing portion 3 is transferred to the horizontal transfer register 5. Subsequently, four clock pulses $\phi_{13}$ are applied to the electrode 4 of the storing portion 3, and the charge in the image sensing portion 1 transferred to the storing portion 3 is transferred to the horizontal transfer register 5. Each time a clock pulse $\phi_{13}$ is generated, four clock pulses $\phi_{14}$ are put out to the electrode of the horizontal transfer register 5, and the charge transferred to the horizontal transfer register 5 is discharged through the amplifier 7. In the present embodiment, the clear operation of the CCD is effected once for each cell, but where there is left a great deal of charge, several cycles of operation will be necessary. The condition of the apparatus shifts to the condition a-2 and, when a signal SD for opening the shutter is put out from the ROM 55, the shutter 62 is opened and the image sensing portion 1 is exposed to the object image. The shutter 62 is closed after it has been opened for a predetermined time, and in the meantime, a charge corresponding to the brightness of the object image is stored in each cell of the image sensing portion 1.

After the shutter has been closed, four clock pulses $\phi_{11}$ and $\phi_{13}$ are put out at a time, and (1,1)–(1,4) in FIG. 1 are transferred to [1,1]–[1,4], (2,1)–(2,4) to [2,1]–[2,4], . . . , (4,1)–(4,4) to [4,1]–[4,4], (5,1)–(5,4) to (1,1)–(1,4), . . . and, (9,1)–(9,4) to (5,1)–(5,4).

Thereafter, from time $t_{11}$, four clock pulses $\phi_{14}$ are put out and the unwanted charge in the horizontal transfer register 5 is put out. At time $t_{12}$, $\phi_{11}$ and $\phi_{13}$ are put out and the charges stored in (1,1)-(1,4) during exposure are transferred to the horizontal transfer register 5, and are put out as the video output signal VS at the clock pulse $\phi_{14}$ put out at time $t_{13}$.

When this operation is repeated nine times, all the charge stored in the image sensing portion 1 during exposure is put out as the video output signal VS. At time $t_{15}$, the termination signal STP is put out from the ROM 55, whereupon the driving operation of the CCD 10 is terminated.

The operation during the photographing of a moving image will now be described by reference to FIG. 6B.

First, the start switch 51 is depressed and the counter 54 is cleared. Nine pulses $\phi_{11}$ are put out during the period (b-1) and all the charge in the image sensing portion 1 is transferred to the storing portion 3. Clock pulse $\phi_3$ is put out at every other clock pulse $\phi_{11}$ and the charge in the storing portion 3 is transferred to the horizontal transfer register 5. During the period (b-2), clock pulse $\phi_{14}$ is generated and all the unwanted charge is removed. Also, during the period (b-2), the exposure operation is excecuted in the image sensing portion 1. Subsequently, the signal charge stored in the image sensing portion 1 during the period b-4 is transferred to the storing portion 3. At time $t_{21}$, the driving clock pulse $\phi_{11}$ of the image sensing portion 1 and the driving clock pulse $\phi_{13}$ of the storing portion 3 are put out simultaneously and then, one more clock pulse $\phi_{11}$ is put out until clock pulse $\phi_{13}$ is put out and thus, the charges of (1,1)-(1,4) of FIG. 1 and the charges of (2,1)-(2,4) are added together and stored in [4,1]-[4,4]. Likewise, (3,1)-(3,4) and (4,1)-(4,4), ..., (7,1)-(7,4) and (8,1)-(8,4) are added together and stored in [4,1]-[4,4]. During the period b-4, five clock pulses $\phi_{13}$ are put out and thus, the added charges in (1,1)-(1,4) and (2,1)-(2,4) are stored in the horizontal shift register 7 and the other added charges are stored in [1,1]-[1,4], [2,1]-[2,4] and [3,1]-[3,4] of the storing portion 3. The unadded charges of (9,1)-(9,4) are stored in [4,1]-[4,4]. The condition then shifts to the read-out period b-2' of the first field. The read-out period b-2', as previously mentioned, corresponds to the storing period of the second field and during this period, the storing operation is executed in the image sensing portion 1. In the storing portion 3, clok pulse $\phi_{14}$ is first applied to the electrode of the horizontal transfer register, and the added charges of (1,1)-(1,4) are (2,1)-(2,4) stored in the horizontal transfer register 7 are read out. Subsequently, the added charges of (3,1)-(3,4) and (4,1)-(4,4) are read out. Finally, the charges of (9,1)-(9,4) are read out. However, this signal is not used as the video output signal VS.

Subsequently, the condition shifts to the second b-4 period and the charge of the second field is transferred to the storing portion 3. At this time, an operation different from the during the first b-4 period is effected. That is, pulse $\phi_{13}$ is put out at time $t_{24}$ and the charges of (1,1)-(1,4) are transferred to [4,1]-[4,4]. Subsequently, at time $t_{25}$, the charges of the image sensing portion are transferred line by line. Subsequently, at time $t_{26}$, clock pulses $\phi_{11}$ and $\phi_{13}$ are put out simultaneously, and the added charges of (2,1)-(2,4) and (3,1)-(3,4) are stored in [4,1]-[4,4]. Thereafter, similar operation takes place, whereby the charges of (1,1)-(1,4) are stored in the horizontal transfer register, the added charges of (2,1)-(2,4) and (3,1)-(3,4) are stored in [1,1]-[1,4], and the added charges of (8,1)-(8,4) and (9,1)-(9,4) are stored in [4,1]-[4,4]. Then, the charge of the second field stored in the storing portion 3 during the period b-2 is read out. It is the charges of (1,1)-(1,4) that are read out by the first four clock pulses $\phi_{14}$ at this time and therefore, these are not used as the video output signal.

As described above, the operation of (b-2)→(b-4)→(b-2')→(b-4) is repeated.

Figure 7:
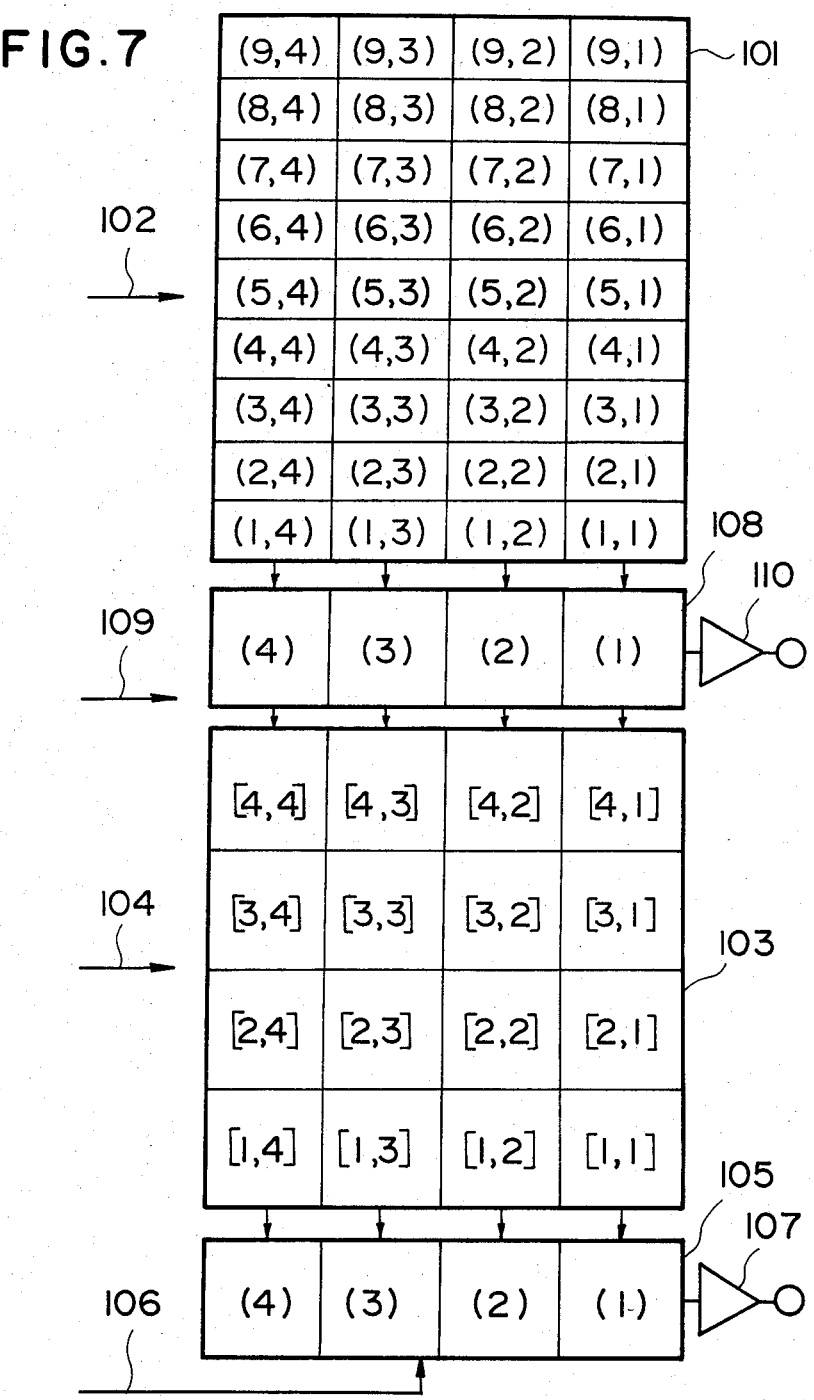
FIG. 7 schematically shows the construction of a frame transfer type CCD according to a second embodiment of the present invention.

FIG. 7 shows the construction of a frame transfer type CCD according to a second embodiment of the present invention.

In FIG. 7, reference numeral 101 designates the image sensing portion of the frame transfer type CCD. In this image sensing portion, for example, in the case of the NTSC system, the number of cells in the vertical direction is set to a number substantially equal to the number of scanning lines, i.e., on the order of 490. That is, this CCD has a number of cells about twice that in the conventional frame transfer type CCD. As the number of cells in the horizontal direction of the image sensing portion 101, a number corresponding to the color sub-carrier frequency, i.e., a number on the order of 390 or 570, is usually adopted.

In the image sensing portion 101 of FIG. 7, there is shown an example in which nine elements in the vertical direction and four elements in the horizontal direction are arranged. In FIG. 7, reference numeral 102 designates an electrode for applying to this image sensing portion a voltage for effecting light reception and transfer.

In FIG. 7, reference numeral 103 denotes a storing portion, in which the number of cells in the vertical direction is about ½ of that of the image sensing portion and a number of cells equal to that of the image sensing portion 101 are arranged in the horizontal direction. Accordingly, this storing portion comprises a number of cells equal to that of the storing portion of the conventional frame transfer type CCD.

In FIG. 7, reference numeral 104 designates an electrode for applying a voltage for transferring charge as in the image sensing portion.

In FIG. 7, reference numeral 105 denotes a horizontal transfer register which comprises a row of charge transfer portion comprising a number of cells substantially equal to the number of cells in the horizontal direction of the image sensing portion or the storing portion.

Designated by 106 in FIG. 7 is an electrode for applying a voltage for transferring the charge of the horizontal transfer register 105.

Denoted by 107 in FIG. 7 is an amplifier for converting the charge transferred from the horizontal transfer register 105 into a voltage output.

This frame transfer type CCD does not greatly differ in construction from the conventional frame transfer type area sensor except that the number of cells in the vertical direction of the image sensing portion is twice that in the conventional frame transfer type area sensor. A great difference between the two is that a second horizontal transfer register 108 substantially identical to the horizontal transfer register 105 is provided between the image sensing porton 101 and the storing portion 103. Reference numeral 109 designates an electrode for applying a voltage for transferring the charge in the second horizontal transfer register, and reference numeral 110 denotes an amplifier for converting the transferred charge into a voltage.

There are several charge transfer methods such as single phase drive, two-phase drive, three-phase drive, four-phase drive, etc., and any of these is applicable, but taking the single phase drive method as an example for simplicity of description, the constructions of the second horizontal transfer register 108 and the storing portion 103 will hereinafter be described by reference to FIG. 8.

The single phase drive method herein referenced is described in the aforementioned U.S. Pat. No. 4,229,752 and the detailed operation thereof need not be described herein.

Figure 8:
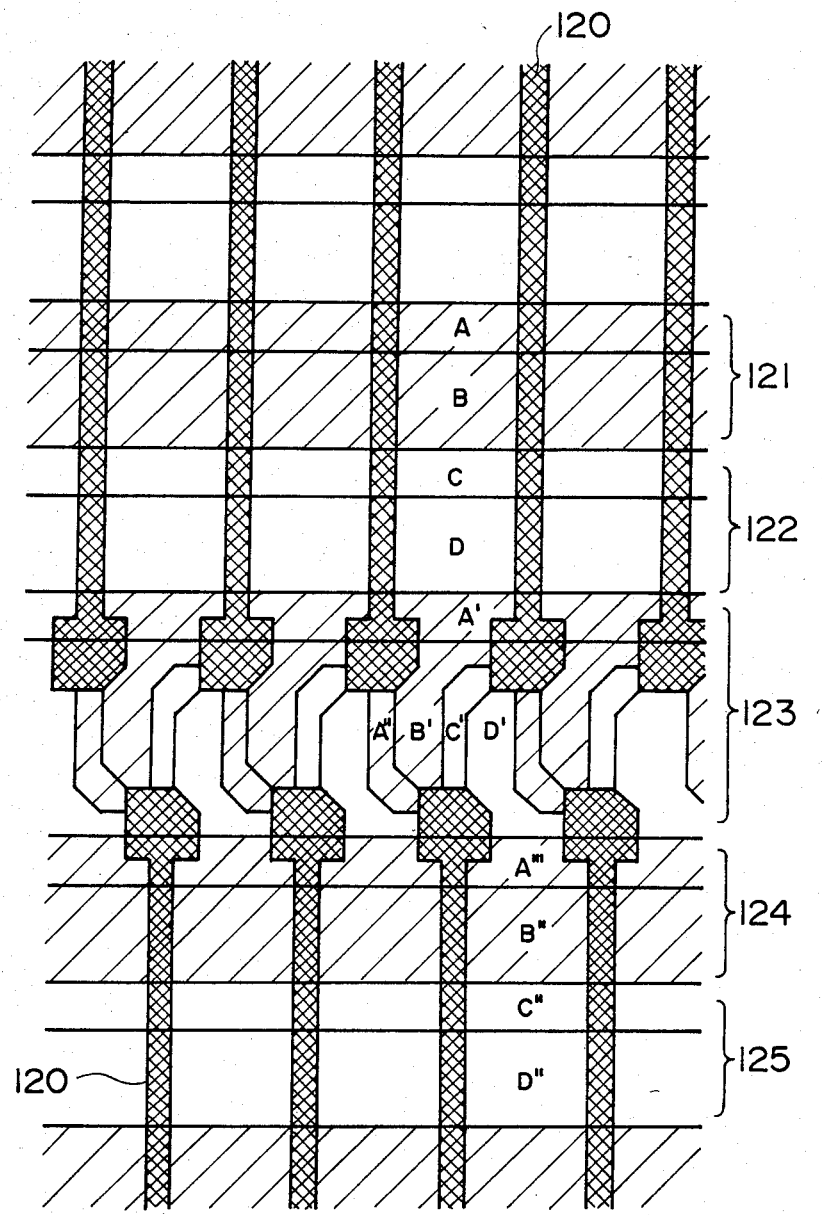
FIG. 8 is a schematic view of a portion of the CCD according to the second embodiment.

Referring to FIG. 8, reference numeral 120 designates a channel stopper for preventing leakage of charge between the cells in the horizontal direction.

Reference numeral 121 denotes the poly-silicon electrode of the image sensing portion, and the area to which this electrode is attached comprises an area A and an area B which differ from each other in the potential condition in the silicon. Reference numeral 122 designates an area in which a virtual electrode is formed in the silicon. The area 122 comprises an area C and an area D which differ from each other in the potential condition in the silicon.

In the vertical direction, one cell consists of these areas A, B, C and D.

Designated by 123 is a second horizontal transfer register area. In this area, a poly-silicon electrode is formed in the shape of comb-teeth indicated by hatching, and the portion below this poly-silicon electrode is divided into areas A', B' and C' which differ in the potential condition. The areas A' and A" are identical in potential, but are separated from each other by a channel stopper. The areas C' and D' are set to the same potential as the virtual electrode portion 122 of the image sensing portion. 124 and 125 are constructed similarly to 121 and 122, respectively, of the image sensing portion. The amounts of charge stored in 124 and 125 are about twice those stored in 121 and 122.

Figure 9:
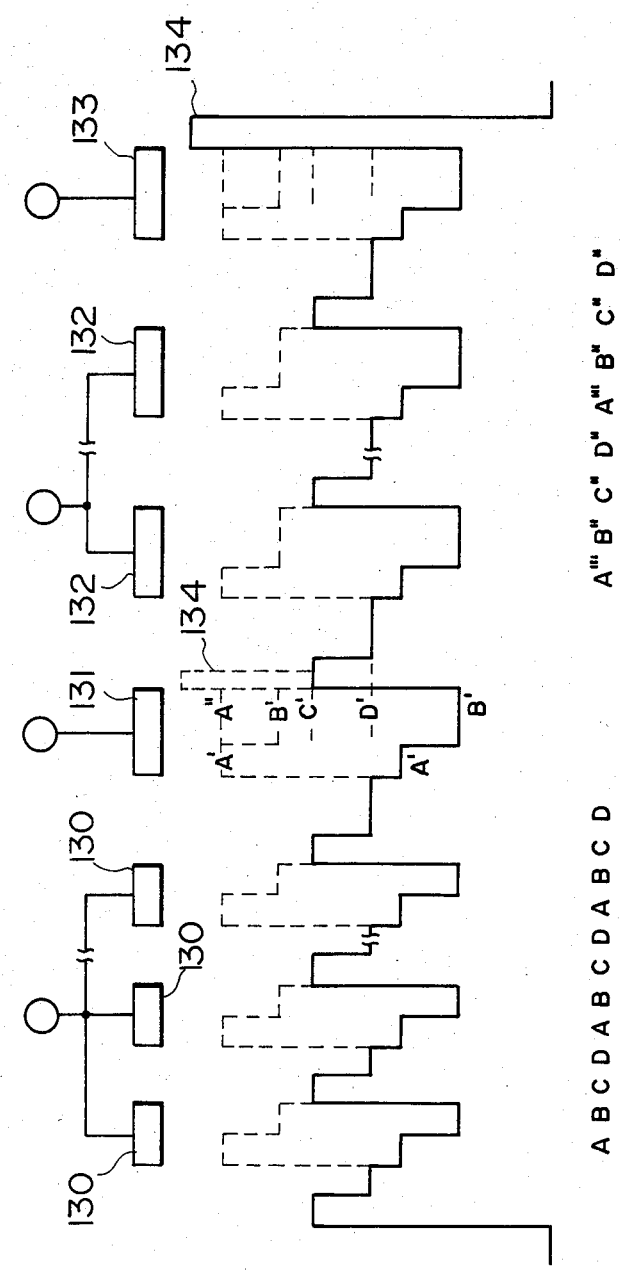
FIG. 9 shows the condition of the interior potential of the CCD according to the second embodiment.

FIG. 9 shows the interior potential condition of the CCD of the construction shown in FIG. 8.

In FIG. 9, reference numeral 130 designates the poly-silicon electrodes of the image sensing portion corresponding to 121 of FIG. 8, and all of the poly-silicon electrodes of the image sensing portion are commonly connected so that a voltage for charge transfer is applied thereto. The portion below the poly-silicon electrodes 130 is divided into areas A and B as described in connection with FIG. 8, the area A being higher in potential condition than the area B. The dotted lines in FIG. 9 show the condition in which the poly-silicon electrodes 130 are at high negative potential, and the solid lines show the potential at which the potential of the poly-silicon electrodes 130 are slightly negative or positive.

The potential of the virtual electrode portion 122 of FIG. 8 is slightly higher in the area C than in the area D, as shown in FIG. 9. The potential of this portion does not depend on the voltage applied to the electrodes 130, but is always maintained constant. Accordingly, if a predetermined voltage is applied to the poly-silicon electrodes 130, charge will be stored and, if a pulse-like voltage is applied to the poly-silicon electrodes 130, charge will be transferred. Further description is not needed.

In FIG. 9, reference numeral 131 designates the poly-silicon electrode of the second horizontal transfer register. This electrode is separated from the other electrodes so that an independent voltage is applied thereto. The interior potential of this horizontal transfer register is as shown below the poly-silicon electrode 131 of FIG. 9.

In FIG. 9, reference numeral 132 designates the poly-silicon electrodes of the storing portion. The interior potential of this storing portion is similar to that of the image sensing portion. Reference numeral 133 denotes the electrode of the first horizontal transfer register (105 in FIG. 7). The first horizontal transfer register is similar in construction to the second horizontal transfer register, but the former differs slightly from the latter in that one side thereof is closed by a channel transfer. Reference numeral 134 shows the potential condition of the channel stopper.

The function of the charge in the second horizontal transfer register will hereinafter be described. The charge stored in the area B of the image sensing portion has its potentials in areas A and B increased as indicated by dotted lines in FIG. 9 by a pulse voltage of negative potential being applied to the poly-silicon electrodes 130 and is transferred into the potential well area D of 122 of FIG. 8. When, at this time, a slightly negative or positive potential is applied to the poly-silicon electrode 131 of the second horizontal transfer register, the potentials of the areas A' and B' assume the potential conditions indicated by solid lines in FIG. 9 and the charge in the area D enters the area B' through the area A'. Subsequently, when a negative high potential is applied to the electrode 131, the potentials of the areas A' and B' assume the conditions indicated by dotted lines and the charge in the area B' is transferred through the area C' (which has a predetermined potential indicated by dotted line) to the area D' (which has a predetermined potential indicated by dotted line). When, at this time, a slightly negative or positive voltage is applied to the poly-silicon electrodes 132 of the storing portion, the potentials of the area D' to the areas A''' and B'' fall as indicated by solid lines and the charge in the area D' is transferred through the area A''' to the area B''.

The charge thus transferred to the area B'' of the image sensing portion is transferred through the area C'' to the area D'' because the potentials of the areas A''' and B'' become as indicated by dotted lines by a pulse-like voltage of negative potential being applied to the poly-silicon electrodes 132 of the storing portion. Consequently, by a pulse voltage as the drive signal being applied to the electrodes 132, the stored charge is transferred to B''→D''→B'' in succession and transferred to the first horizontal transfer register 105, and then can be read out through the first horizontal transfer register 105. The above-described flow of the charge shows that it is entirely equal in operation to that in the conventional frame transfer type CCD which does not have the second horizontal transfer register.

Description will now be made of the flow of the charge in a case where the signal is read out through the second horizontal transfer register.

The charge transferred to the area D' has been transferred to the storing portion by a slightly negative or positive potential being applied to the poly-silicon electrodes 132 of the storing portion in the above-described operation, but a negative high voltage is applied to these electrodes to hold the potentials of the areas A''' and B'' as indicated by dotted lines and a pulse-like voltage is applied to the second horizontal transfer register 131 to cause the potentials of the areas A'' and B' to alternately shift to the conditions indicated by solid lines and dotted lines, whereby the charge in the area D' is transferred to A''→B'→C'→D' in the horizontal direction and signal read-out operation is executed through the amplifier (110 in FIG. 1).

Reference is now made to FIG. 10 to describe the operation when the device of the present invention is operated as an actual camera.

FIG. 10(a) shows the operating condition when the device is operated as a video still camera, and FIG. 10(b) shows the operating condition when the device is operated as a video camera for photographing moving images.

Description will first be made of a case where the device is operated as a video still camera.

The condition S-1 of FIG. 10(a) shows the all clear condition in which the charge stored by a dark current or the like is cleared through an anti-blooming drain immediately before the exposure operation or in which the CCD is operated at a high speed to cause the charge to be discharged outwardly and cleared.

The shutter is then opened and the condition shifts to the exposure condition, i.e., the storing condition (S-2) of the image sensing portion. The condition then shifts to the first field read-out condition (S-3) of the horizontal transfer register 108.

In the condition (S-2), the shutter is closed in a predetermined exposure time and an image signal (charge) is stored on each cell shown in FIG. 7, whereafter in the condition (S-3), the charges stored in the cells of the image sensing portion are transferred in the vertical direction by two lines each. That is, in the case of the FIG. 7 embodiment, the charges stored in (1,1)-(1,4) are transferred to the cells [4,1]-[4,4] of the storing portion through the second horizontal transfer register 108, and the charges stored in (2,1)-(2,4) are transferred to the second horizontal transfer register 108. Likewise, the charges stored in the cells in the other lines are also transferred by two lines. Thereby, the charges stored in the sections (3,1)-(3,4), (4,1)-(4,4), (5,1)-(5,4), (6,1)-(6,4), (7,1)-(7,4), (8,1)-(8,4) and (9,1)-(9,4) are respectively transferred to the sections (1,1)-(1,4), (2,1)-(2,4), (3,1)-(3,4), (4,1)-(4,4), (5,1)-(5,4), (6,1)-(6,4) and (7,1)-(7,4).

After the charges have been transferred by two lines in this manner, the charges transferred to the second horizontal transfer register 108 are delivered outwardly through the amplifier 110. Thereby, the stored charges transferred to the horizontal transfer register 108 in the described manner, namely, the charges stored in (2,1)-(2,4) during exposure, are put out serially.

Thereafter, the stored charges in the cells of the image sensing portion are again transferred by two lines. Thereby, the charges transferred to the sections (1,1)-(1,4), namely, the charges stored in (3,1)-(3,4) during exposure, shift to the cells [4,1]-[4,4] of the storing portion through the horizontal transfer register, and the charges transferred to the sections (2,1)-(2,4), namely, the charges stored in (4,1)-(4,4) during exposure, are transferred to the horizontal transfer register 108. Also, at this time, the charges transferred to the cells in each line of the storing portion 103 are transferred by one line. Consequently, the charges previously transferred to the cells [4,1]-[4,4], namely, the charges stored in (4,1)-(4,4) during exposure, are transferred to the cells [3,1]-[3,4]. Thereafter, reading-out of the charges transferred to the horizontal transfer register is again effected, and the charges transferred to the horizontal transfer register 108 and stored in (4,1)-(4,4) during exposure as described above are delivered serially. Thereafter, in a similar manner, the operation of transferring by two lines the charges stored in the cells of the image sensing portion 101 and transferring by one line the charges transferred to the cells of the storing portion 103 and the operation of reading out the charges transferred to the horizontal transfer register 108 are executed alternately, whereby the charges stored in (2,1)-(2,4), (4,1)-(4,4), (6,1)-(6,4) and (8,1)-(8,4) during exposure are successively delivered from the second horizontal transfer register 108. That is, the first field read-out operation is executed. Also, the charges stored in (1,1)-(1,4), (3,1)-(3,4), (5,1)-(5,4) and (7,1)-(7,4) during exposure are respectively transferred to the cells [1,1]-[1,4], [2,1]-[2,4], [3,1]-[3,4] and [4,1]-[4,4] of the storing portion. After the first field read-out operation has thus been executed, the condition shifts to the second field read-out condition, namely, the condition S-4.

In the condition S-4, the charges transferred to the cells in each line of the storing portion are transferred by one line, whereafter the charges transferred to the first horizontal transfer register 105 are read out, whereby the charges stored in (1,4)-(4,4), (3,1)-(3,4), (5,1)-(5,4), (7,1)-(7,4) and (9,1)-(9,4) during exposure are delivered from the horizontal transfer register, thus terminating the second field read-out.

Thus, according to the present invention, it is possible for the image signals corresponding to one frame recorded at the same point of time to read out the first field, and then the interlaced second field as in the usual TV operation. At this time, the second horizontal transfer register 108 operates as a horizontal transfer shift register and a parallel-in parallel-out shift register.

Description will now be made of the operation when the present device is operated as an ordinary video camera for taking out video signals of moving pictures.

The condition M-1 of FIG. 10(b) corresponds to the operation S-1 of FIG. 10(a). However, this operation is not indispensable.

In this case, the shutter is not necessary and storage and read-out are repeated simultaneously. M-2, M-2', . . . show the storing conditions, and the prime (') indicates the second field. That is, the charge stored at M-2 (the first field) is read out at M-3, and the charge stored at M-2' (the second field) is read out at M-3'.

The condition M-4 shows the condition in which the charges stored in the image sensing portion are transferred to the storing portion.

The frame transfer type CCD of this second embodiment has 490 cells in the vertical direction of the image sensing portion and 245 cells in the storing portion and therefore differs from the conventional frame transfer type CCD in the operation of transferring charges from the image sensing portion of the storing portion and the interlace method. This operation will hereinafter be described by reference to FIG. 7.

First, after exposure and storage have been effected in the condition M-2, transfer of the charges stored in the image sensing portion to the storing portion is effected in the condition M-4. In this transfer operation, the charges stored in (1,1), (1,2), (1,3) and (1,4) are first transferred to [4,1], [4,2], [4,3] and [4,4] of the storing portion 3 through the second horizontal transfer register 108. Subsequently, the charges in (2,1), (2,2), (2,3) and (2,4) are likewise transferred to [4,1], [4,2], [4,3] and [4,4]. At this time, no pulse voltage is applied to the storing portion, and the charges stored in (1,1)-(1,4) during exposure are held in [4,1]-[4,4]. Thereby, the charges stored in two rows, i.e., (1,1)-(1,4) and (2,1)–(2,4) of the image sensing portion, are added to [4,1]–[4,4].

Subsequently, one line of the storing portion is transferred, that is, the charges added in [4,1]–[4,4] are transferred to [3,1]–[3,4], and in the manner described above, two lines of the image sensing portion, namely, the charges stored in (3,1)–(3,4) and (4,1)–(4,4) during exposure, are again transferred to [4,1]–[4,4] and added therein. Thereafter, the operation of transferring one line of the storing portion and the operation of transferring two lines of the image sensing portion to [4,1]–[4,4] and adding them therein are repeated in the same manner, whereby the added charges in (1,1)–(1,4) and (2,1)–(2,4) are transferred to [1,1]–[1,4] of the storing portion, the added charges in (3,1)–(3,4) and (4,1)–(4,4) are transferred to [2,1]–[2,4], the added charges in (5,1)–(5,4) and (6,1)–(6,4) are transferred to [3,1]–[3,4], and the added charges in (7,1)–(7,4) and (8,1)–(8,4) are transferred to [4,1]–[4,4].

Thereafter, the condition shifts to the conditions M-2' and M-3 and exposure and storage operations are executed while, at the same time, the signals transferred to the storing portion 103 as described above are transferred to the horizontal transfer register 105 line by line and the signals transferred to the horizontal transfer register are delivered from the horizontal transfer register. Thereby, the first field read-out operation is executed.

After the first field read-out operation has been terminated in this manner, the operation of transferring the charges stored in the image sensing portion 101 to the storing portion 103 by M-2' is executed at M-4. This is the second field read-out operation and therefore, transfer and addition of two rows of the image sensing portion are executed with the cells shifted by one line when the charges are transferred from the image sensing portion 101 to the cells [4,1]–[4,4].

That is, for the second field, the charges stored in the cells (2,1)–(2,4) and the cells (3,1)–(3,4), the charges stored in the cells (4,1)–(4,4) and the cells (5,1)–(5,4), and the charges stored in the cells (6,1)–(6,4) and (7,1)–(7,4) are respectively transferred to [4,1]–[4,4] and added therein, whereby the charges added to each line of the storing portion 103 are transferred and stored. Thereafter, by M-3', the charges stored in the storing portion 103 are delivered by the horizontal transfer register 105, whereby the second field read-out operation is terminated. When two rows of the image sensing portion cells are added in this manner, the first transfer and addition operation and the second transfer and addition operation are shifted by one line, whereby a signal interlaced with the first field can be obtained and image photographing can be executed as a video camera.

At this time, the second horizontal transfer register 108 is used as a parallel-in parallel-out shift register and does not have the horizontal transfer function.

The charges in the cells of the image sensing portion are added by two lines each and stored in the cells of the storing portion and therefore, the required capacity of each cell of the storing portion is about twice the capacity of each cell of the image sensing portion. Also, as the number of cells added together becomes greater, the capacity of each cell of the storing portion must be made greater. However, where the device is used exclusively for photographing stationary images, the capacity of the storing portion may be made substantially equal to the capacity of the image sensing portion.

Figure 11:
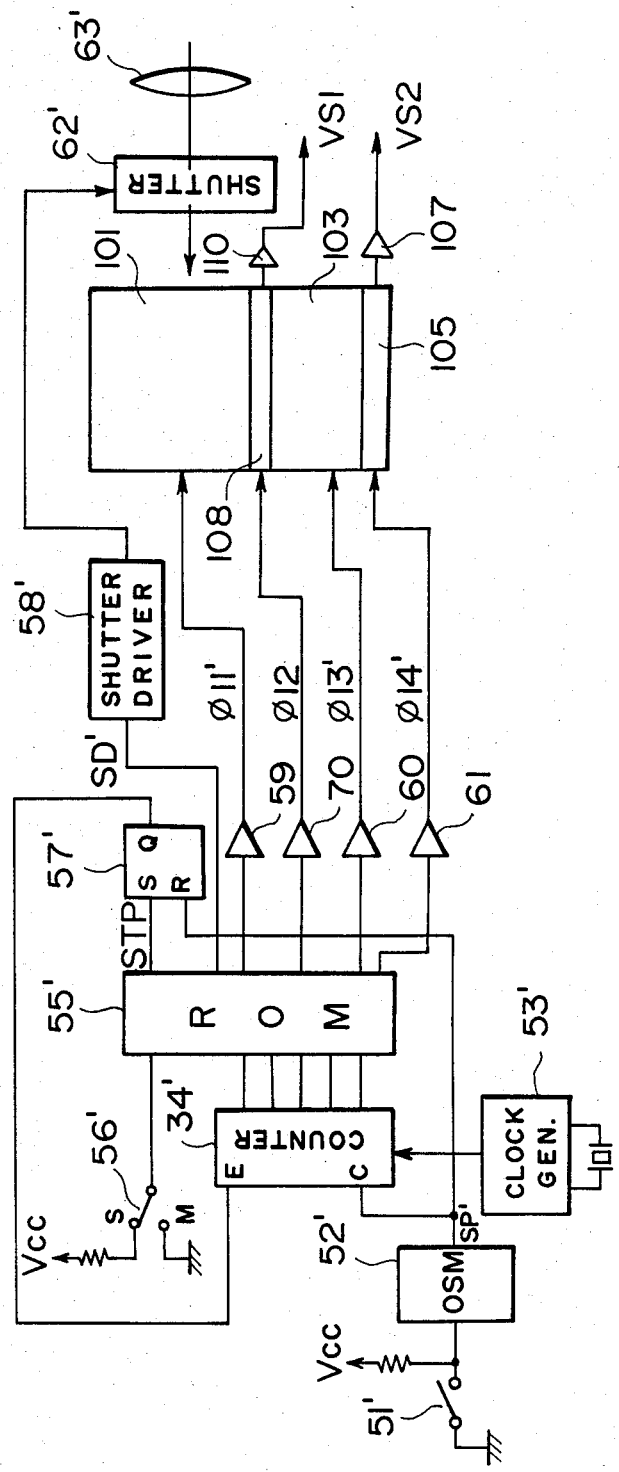
FIG. 11 diagrammatically shows the driving circuit in the second embodiment.
Figure 12A:
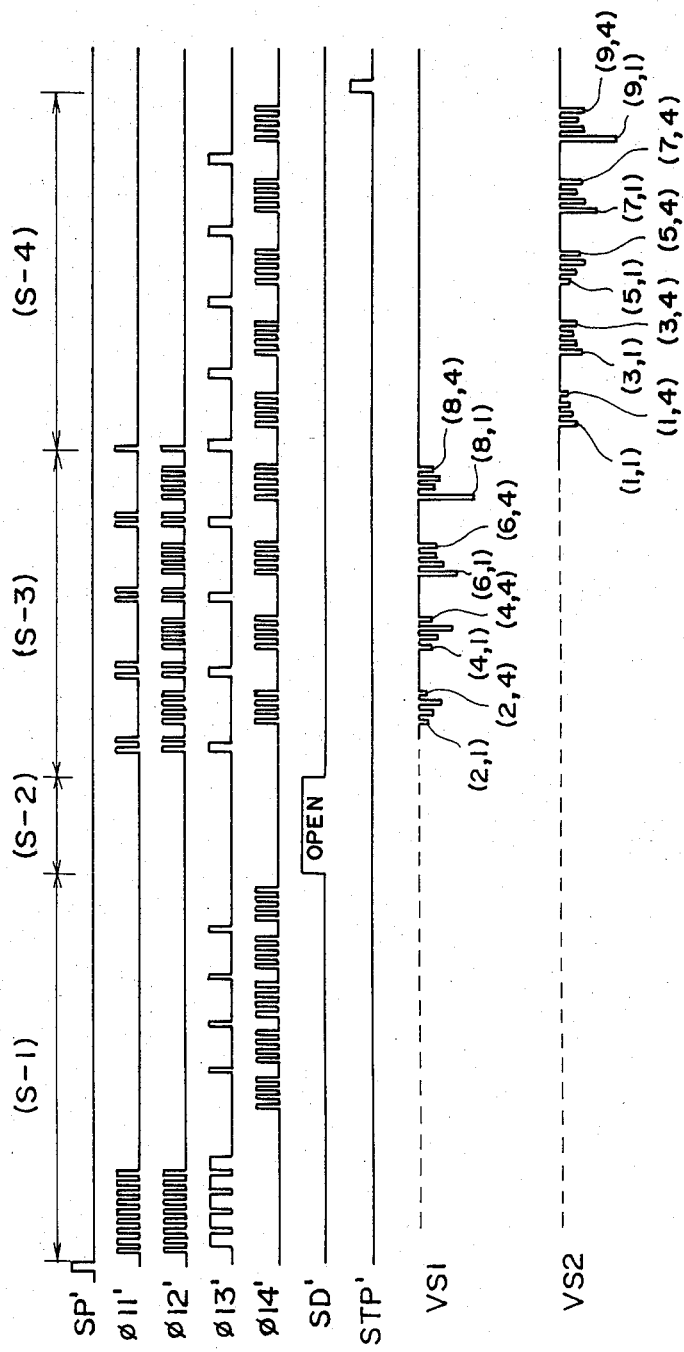
FIG. 12A is a timing chart of the various portions of FIG. 11 during the photographing of a stationary image.
Figure 12B:
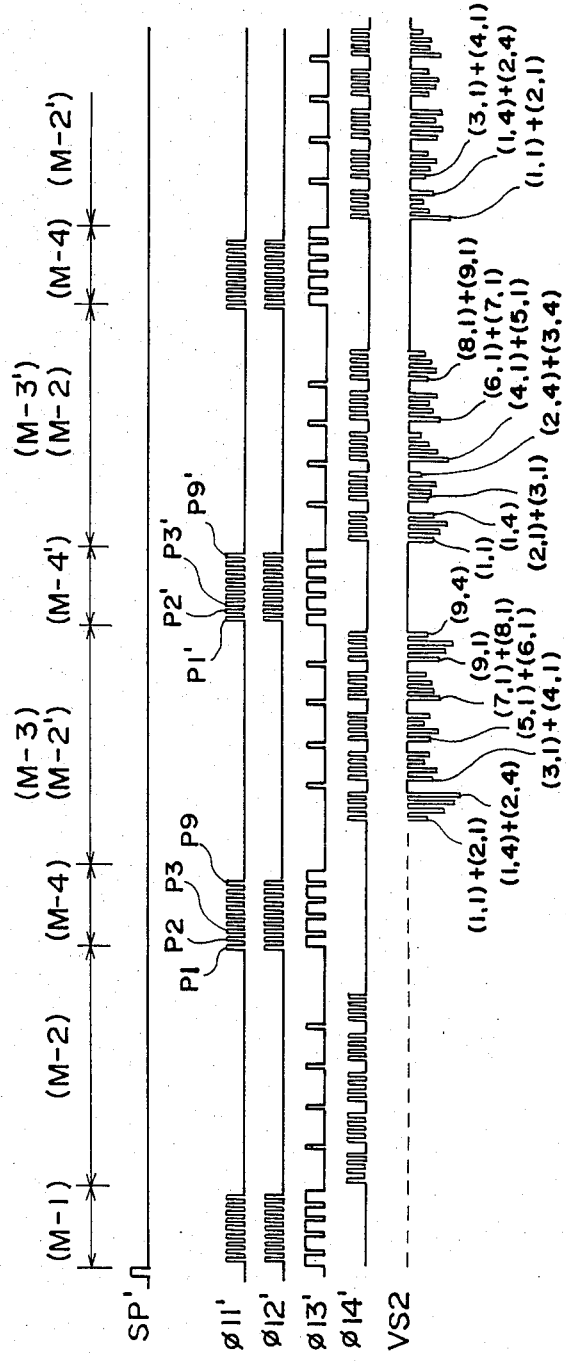
FIG. 12B is a timing chart of the various portions of FIG. 11 during the photographing of a moving image.

FIG. 11 shows an example of the driving circuit of the second embodiment. In FIG. 11, elements similar in function to those of FIG. 5 are given similar reference numerals with a prime affixed thereto. FIGS. 12A and 12B are timing charts of the various portions of FIG. 11 during still photography and moving picture photography, respectively. In FIG. 12, the high level conditions of CCD driving clock pulses $\phi_{11}'$, $\phi_{12}$, $\phi_{13}'$ and $\phi_{14}'$ show the condition in which a slightly positive or negative potential is applied to the electrode, and the low level conditions of those clock pulses show the condition in which a negative high potential is applied to the electrode. In FIG. 11, reference numeral 70 designates a CCD driver which puts out the clock pulse $\phi_{12}$ for driving the second horizontal transfer register 108. The operations of the various portions of FIG. 11 are substantially similar to those of FIG. 5, but ROM 55' contains the conversion tables during still photography and moving picture photography shown in the time charts of FIGS. 12A and 12B.

The operation during still photography will be described by reference to FIG. 12A.

When the start switch 51' is depressed, start pulse SP is put out and counter 54' is cleared and upon the output clock of clock oscillator 53', the counter 54' counts up. The output of the counter 54' is applied as input to ROM 55', which puts out a signal following the time chart of FIG. 12A because switch 56' is connected to a contact S. First, during period (S-1), the charge in each cell of CCD is cleared. Therefore, as indicated by clock pulse $\phi_{13}'$, clock pulses $\phi_{11}'$, and $\phi_{12}$ of a frequency twice as high as that of $\phi_{13}'$, are applied with the electrode of the storing portion as a slightly positive or negative potential. Thereupon, the charges in the cells of the image sensing portion 101 are added by two cells each in the vertical direction and transferred to the cells of the storing portion. They are successively read out from the horizontal transfer register 105 by clock pulse $\phi_{14}'$. When the clear is terminated, the period shifts to period (S-2), and shutter 63' is opened, whereby the image sensing portion 101 is exposed and charge is stored in each cell thereof. Subsequently, the shutter 63' is closed, whereupon the exposure operation is terminated, and the period shifts to a first field read-out period (S-3). First, when the electrode of the storing portion 103 is at a slightly positive or negative potential, two pulses $\phi_{11}'$ and $\phi_{12}$ are put out and the charges in (1,1)–(1,4) are transferred to [4,1]–[4,4] while the charges in (2,1)–(2,4) are transferred to the second horizontal transfer register 108. In this condition, the electrode potential of the storing portion 103 is a negative high potential. That is, a potential barrier is formed between the second horizontal transfer register 108 and the storing portion 103. By four clock pulses $\phi_{12}$ being applied in this condition, the charges stored in (2,1)–(2,4) during exposure are read out from the second horizontal transfer register 108 through the amplifier 110. Subsequently, the potential barrier between the second horizontal transfer register 108 and the storing portion 103 is eliminated and two clock pulses $\phi_{11}'$ and $\phi_{12}$ are put out, whereby the charges in (3,1)–(3,4) are transferred to [4,1]–[4,4] and the charges in (4,1)–(4,4) are transferred to the second horizontal transfer register 108.

The operation just described is repeated, whereby (2,1)–(2,4), (4,1)–(4,4), (6,1)–(6,4), . . . , (8,1)–(8,4) are successively read out from the second horizontal transfer register. That is, a first field signal VS1 is read out.

At this time, the charges stored in (1,1)–(1,4) during exposure are transferred to the horizontal transfer register 105 by clock pulse $\phi_{13}'$, and the charges of the other odd lines are stored in the storing portion 103.

Subsequently, the period shifts to a second field read-out period (S-4). In (S-4), by four clock pulses $\phi_{14}'$ put out for one pulse $\phi_{13}'$, a second field signal VS2 is read out from the horizontal transfer register 105 through the amplifier 107. That is, the charges stored in (1,1)–(1,4), (3,1)–(3,4) and (9,1)–(9,4) during exposure are successively read out. Finally, after the charge in (9,4) has been put out, termination signal STP' is put out and the counter 54' terminates its counting operation.

The operation timing during moving picture photography will now be described by reference to FIG. 12B.

Start pulse SP is put out and the clear period (M-1) is first entered. The potential barrier between the second horizontal transfer register 108 and the storing portion 103 is eliminated by $\phi_{13}'$ and the charges in the image sensing portion 101 are successively transferred to the storing portion 103.

The charges stored in the storing portion 103 are successively put out from the horizontal transfer register 105 through the amplifier 107 by clock pulses $\phi_{13}'$ and $\phi_{14}'$ during the next first field exposure period (M-2).

During transfer period (M-4), nine clock pulses $\phi_{11}'$ and $\phi_{12}$ are put out at the same timing, and the potential barrier between the second horizontal transfer register 108 and the storing portion 103 is eliminated by clock pulse $\phi_{13}'$, whereby charges are transferred to the storing portion 103 through the second horizontal transfer register 108. The potential barrier is eliminated while the first and second pulses P1 and P2 of the nine clock pulses $\phi_{11}'$ and $\phi_{12}$ are being put out and therefore, charges are added and stored in [4,1]–[4,4] by the combinations of (1,1) and (2,1), (1,2) and (2,2), (1,3) and (2,3), (1,4) and (2,4) of FIG. 7. Thereafter, in a similar manner, the added charges in (3,1) and (4,1) are stored in [4,1] and the added charges in (5,1) and (6,1) are stored in [4,1]. When the period (M-4) is terminated, the added charges in (1,1)–(1,4) and (2,1)–(2,4) are stored in the horizontal transfer register 105, and the added charges in (3,1)–(3,4) and (4,1)–(4,4) are stored in [1,1]–[1,4]. Thereafter, similar operation takes place. The charges in (9,1)–(9,4) are stored in [4,1]–[4,4].

The period then shifts to a first field signal read-out period (M-2'). This period also in a second field signal exposure period (M-3). During this period, the charges stored in the horizontal transfer register 105 and the storing portion 103 are read out by clock pulses $\phi_{13}'$ and $\phi_{14}'$. These are used as the first field video output, but the charges stored in (9,1)–(9,4) during exposure are not added charges and therefore are not used.

Subsequently, the period shifts to a second field transfer period (M-4'). The difference between the operation during (M-4') and the operation (M-4) during the first field transfer period is that the generation phase of clock pulse $\phi_{13}'$ differs from that of clock pulses $\phi_{11}'$ and $\phi_{12}'$. That is, while the first pulse P' of clock pulses $\phi_{11}'$ and $\phi_{12}'$ is being put out, the potential barrier is eliminated and only the charges in (1,1)–(1,4) are transferred to [4,1]–[4,4]. Subsequently, while second and third pulses P2' and P3' are being put out, the potential barrier is eliminated and the charges in (2,1)–(2,4) and (3,1)–(3,4) are added respectively and stored in [4,1]–[4,4]. Thus, when the transfer period (M-4') is terminated, the charges stored in (1,1)–(1,4) during exposure are transferred to the horizontal transfer register 105 and the charges stored in (2,1)–(2,4) during exposure are added to the charges in (3,1)–(3,4) and stored in [1,1]–[1,4]. The charges added in (8,1)–(8,4) and (9,1)–(9,4) during exposure are stored in [4,1]–[4,4].

Subsequently, the period shifts to a second field read-out period (M-3') and in the manner as previously described, a second field signal is put out by clock pulses $\phi_{13}'$ and $\phi_{14}'$. However, the first output signal is one obtained from the charges stored in (1,1)–(1,4) during exposure and differs in signal level from the other signals obtained by addition and therefore is not used. Thus, the second horizontal transfer register 108 is handled not as a horizontal transfer register but as a parallel-in parallel-out shift register or just in the same way as the other cells during moving picture photography.

According to the present invention, as described above, image signals corresponding to one frame are obtained at a high quality when the device is operated as a video still camera for photographing stationary images. Also, by the second horizontal transfer register being provided between the image sensing portion and the storing portion, images obtained by the image sensing portion at the same point of time can be put out as a frame signal comprising a plurality of fields, namely, first and second fields. Accordingly, the device of the present invention is suitable for photographing a stationary image and can also be matched with a TV interlace operation, and the post-stage signal processing circuit is simplified.

The interlace scanning is generally effected by changing over the clock level condition during the storage time for each field, but the portion of the image sensing portion which is covered with the poly-silicon electrode is low in sensitivity and therefore the interlace effect becomes difficult to obtain. Also, in the level condition, the amount of generated dark current differs, which leads to very poor images. However, in the present invention, the charges stored in vertically adjacent cells are added and made into a signal corresponding to one picture element, and this leads to the possibility of obtaining image signals of high quality having a high interlace effect and moreover less susceptible to the influence of dark current.

Further, the first and second field signals are obtained by changing the combination of additions and this leads to the possibility of obtaining video signals of moving pictures matching the interlace operation of a TV signal, as well as to simplification of the post-stage signal processing circuit and recording circuit. Particularly, where it is desired to record the obtained signals, the device of the present invention can be used in conjunction with the conventional TV signal recording apparatus and this is very effective.

Furthermore, the solid state image sensing device of the present invention can be used for both still photography and moving picture photography and can provide interlaced video signals in either of the two types of photography. This leads to a great reduction in the cost of the image sensing device.

Further, where the object to be photographed is not in motion, if the clock level condition is changed over for each field and the picture element is moved in a cell for each field, it will also be possible to take out signals corresponding to two frames.

The present invention is not restricted to the above-described embodiments, but various modifications may be made thereto within the scope shown in the appended claims.

What is claimed is:

1. A radiation sensing device comprising:
   (A) radiation sensing means for generating an electrical indication indicative of a distribution pattern of received radiation representative of television signal frame information;
   (B) storing means for storing an electrical indication generated by said sensing means and representative of field information based on the frame image information; and
   (C) read-out means for reading out said stored electrical indication from said storing means,
   wherein said sensing means includes a first plurality of sensing elements, and said storing means includes a second plurality of storage elements, the second plurality being approximately equal to one-half the first plurality, and
   wherein each of said sensing elements has a storage capacity for storing an electrical signal generated in response to a received radiation pattern, while each of said storage elements has a storage capacity for storing an electrical signal, the storage capacity of one storage element being larger than that of one sensing element.

2. The device according to claim 1, wherein the storage capacity of one storage element is approximately equal to twice the storage capacity of one sensing element.

3. A charge-coupled radiation sensing device comprising:
   (A) a radiation sensing array responsive to a distribution pattern of radiation for generating a pattern of electrical charge representative of television signal frame information;
   (B) a storage array for receiving and temporarily storing electrical charge generated by said sensing array and representative of field information based on the frame information; and
   (C) a read-out register arranged to read out said electrical charge from said storage array,
   wherein said radiation sensing array includes a first plurality of sensing elements, and said storage array includes a second plurality of storage elements, the second plurality being approximately equal to one-half of the first plurality, and
   wherein each of said sensing elements has a storage capacity for storing an electrical charge generated in response to a received radiation pattern, while each of said storage elements has a storage capacity for storing an electrical charge, the storage capacity of one storage element being larger than that of one sensing element.

4. The device according to claim 3, wherein the storage capacity of one storage element is nearly equal to twice the storage capacity of one sensing element.

5. A frame-transfer type image sensing device comprising:
   (A) a two-dimensional image sensing array responsive to an imagewise distribution pattern of radiation for generating an imagewise pattern of electrical indication representative of television signal frame information;
   (B) a two-dimensional storage array for storing an electrical indication generated by said sensing array and representative of field information based on the frame information; and
   (C) a read-out path for reading out said electrical indication from said storage array,
   wherein said image sensing array includes a first plurality of sensing elements, and said storage array includes a second plurality of storage elements, the second plurality being approximately equal to one-half of the first plurality, and
   wherein each of said sensing elements has a storage capacity for storing an electrical signal generated in response to a received radiation pattern, while each of said storage elements has a storage capacity for storing an electrical signal, the storage capacity of one storage element being different from that of one sensing element.

6. The device according to claim 5, wherein the storage capacity of one storage element is larger than that of one sensing element.

7. The device according to claim 6, wherein the storage capacity of one storage element is approximately equal to twice the storage capacity of one sensing element.

8. A frame-transfer type charge-coupled image sensing device comprising:
   (A) a two-dimensional image sensing array responsive to an imagewise distribution pattern of radiation for generating an imagewise pattern of electrical charge representative of television signal frame information;
   (B) a two dimensional storage array for storing electrical charge generated by said sensing array and representative of field information based on the frame information; and
   (C) a read-out register for reading out said electrical charge from said storage array,
   wherein said image sensing array has a plurality of rows and a plurality of columns, and said storage array has a plurality of rows and a plurality of columns, the number of rows of said storage array being approximately equal to one-half the number of rows of said sensing array, and
   wherein said image sensing array includes a plurality of sensing elements arranged in columns and rows according to said columns and rows of said sensing array, each of said sensing elements having a storage capacity for storing an electrical charge generated in response to a received radiation pattern; and said storage array includes a plurality of storage elements arranged in columns and rows according to said columns and rows of said storage array, each of said storage elements having a storage capacity for storing an electrical charge, the storage capacity of one storage element being different from that of one sensing element.

9. The device according to claim 8, wherein the storage capacity of one storage element is larger than that of one sensing element.

10. The device according to claim 9, wherein the storage capacity of one storage element is approximately equal to twice the storage capacity of one sensing element.

11. The device according to claim 8 or 9 10, where the number of columns of said storage array is equal to the number of columns of said sensing array.

12. A device for generating an electrical indication indicative of an image scansion, comprising:
    (A) a two-dimensional image sensing array having a plurality of one-dimensional image sensing arrays, each for generating an electrical indication indicative of a line scansion of a portion of an image representative of television signal frame information;

(B) a two-dimensional stoarge array having a plurality of one-dimensional storage arrays, each being arranged to store a composite electrical indication composed of a selected plural number of said line scansion indications and representative of field information based on the frame information; and (C) a read-out portion for reading out composite electrical indications from said storage array, wherein the number of said one-dimensional storage arrays is nearly equal to one half the number of said one-dimensional sensing arrays, and wherein each of said one-dimensional sensing arrays includes a plurality of sensing elements, each having a predetermined electrical storage capacity, while each of said one-dimensional storage arrays includes a plurality of storage elements, each having a predetermined electrical storage capacity, the storage capacity of one storage element being larger than that of one sensing element.

13. The device according to claim 12, wherein each of said one-dimensional storage arrays is arranged to store the composite electrical indication composed of two line scansion indications.

14. The device according to claim 13, wherein the storage capacity of one storage element is approximately equal to twice the storage capacity of one sensing element.

15. The device according to claim 12, wherein said one-dimensional sensing arrays are arranged in parallel with each other, and said one-dimensional storage arrays are arranged in parallel with each other.

16. A device for generating an electrical indication indicative of an image scansion, comprising:

(A) a plurality of one-dimensional image sensing arrays arranged in parallel with each other, each of said sensing arrays being for generating an electrical indication indicative of a line scansion of a portion of an image representative of television signal frame information;

(B) a plurality of one-dimensional storage arrays arranged in parallel with each other, said storage arrays being selectively operable in different operation modes including first mode in which each of the storage arrays stores one line scansion indication generated by one sensing array and second mode in which each of the storage arrays stores a composite electrical indication composed of a selected plural number of line scansion indications and representative of field information based on the frame information; and (C) a read-out portion for reading out the electrical indications from said storage arrays.

17. The device according to claim 16, wherein the number of said one-dimensional storage arrays is smaller than that of said one-dimensional sensing arrays.

18. The device according to claim 17, wherein the number of said one-dimensional storage arrays is approximately equal to one half the number of said one-dimensional sensing arrays.

19. The device according to claim 16, 17 or 18, wherein each of said one-dimensional storage arrays is operable, in said second mode, to store the composite electrical indication composed of two line scansion indications.

20. The device according to claim 19, wherein each of said one-dimensional sensing arrays includes a plurality of sensing elements, each having a predetermined electrical storage capacity, while each of said one-dimensional storage array includes a plurality of storage elements, each having a predetermined electrical storage capacity, the storage capacity of one storage element being larger than that of one sensing element.

21. The device according to claim 20, wherein the storage capacity of one storage element is approximately equal to twice the storage capacity of one sensing element.

22. The device according to claim 16, 17 or 18, wherein each of said one-dimensional sensing arrays includes a plurality of sensing elements, each having a predetermined electrical storage capacity, while each of said one-dimensional storage arrays includes a plurality of storage elements, each having a predetermined electrical storage capacity, the storage capacity of one storage element being larger than that of one sensing element.

23. The device according to claim 22, wherein the storage capacity of one storage element is approximately equal to twice the storage capacity of one sensing element.

24. A system for generating an electrical indication indicative of an image scansion, comprising:

(A) a plurality of one-dimensional image sensing arrays arranged in parallel with each other, each of said sensing arrays generating an electrical indication indicative of a line scansion of a portion of an image representative of television signal frame information;

(B) a plurality of one-dimensional storage arrays arranged in parallel with each other;

(C) a read-out portion for reading out electrical indications from said storage arrays; and (D) control means for controlling said storage arrays to cause each of said storage arrays to store a composite electrical indication composed of a selected plural number of said line scansion indications and representative of field information based on the frame information, wherein each of said sensing arrays has a storage capacity for storing an electrical signal generated in response to a received radiation pattern, while each of said storage arrays has a storage capacity for storing an electrical signal, the storage capacity of one storage array being larger than that of one sensing array.

25. A system for generating an electrical indication indicative of an image scansion, comprising:

(A) a plurality of one-dimensional image sensing arrays arranged in parallel with each other, each of said sensing arrays generating an electrical indication indicative of a line scansion of a portion of an image representative of television signal frame information;

(B) a plurality of one-dimensional storage arrays arranged in parallel with each other;

(C) a read-out portion for reading out electrical indications from said storage arrays; and (D) control means for controlling said storage arrays to cause the storage arrays to operate in different operation modes including a first mode in which each of the storage arrays stores one line scansion indication generated by one sensing array and a second mode in which each of the storage arrays stores a composite electrical indication composed of a selected plural number of said line scansion indications and representative of field information based on the frame information.

26. A method of generating an electrical indication indicative of an image scansion, comprising the steps of:
(A) receiving image including information representative of television signal frame information by means of a plurality of one-dimensional image sensing arrays arranged in parallel with each other, each of said sensing arrays generating an electrical indication indicative of a line scansion of a portion of an image;
(B) storing, by a plurality of one-dimensional storage arrays arranged in parallel with each other, electrical indications generated by said sensing arrays in such a manner that each of the storage arrays stores a composite electrical indication composed of a selected plural number of said line scansion indications and such that the stored indications together represent the information of one field of the frame; and
(C) reading out, by a read-out portion, the electrical indications from said storage arrays,
wherein each of said sensing arrays has a storage capacity for storing an electrical signal generated in response to a received radiation pattern, while each of said storage arrays has a storage capacity for storing an electrical signal, the storage capacity of one storage array being larger than that of one sensing array.

* * * * *

UNITED STATES PATENT AND TRADEMARK OFFICE
CERTIFICATE OF CORRECTION

PATENT NO. : 4,499,496

DATED : February 12, 1985

INVENTOR(S) : NOBUYOSHI TANAKA, ET AL.

It is certified that error appears in the above-identified patent and that said Letters Patent is hereby corrected as shown below:

Column 1:   line 4, delete "1. Field of";

line 5, insert --"1. Field of-- before "the Invention".

Column 2:   line 48, before "cells" insert --the--;

line 56, change "none" to --nine--.

Column 3:   line 21, change "designated" to --designates--;

line 53, change "depends" to --depend--.

Column 4:   line 8, change "polysilicon" to --poly-silicon--.

Column 5:   line 6, change "noise" to --noisy--;

line 54, change "these" to --those--.

Column 6:   line 23, after "of" (second occurrence) insert --a--;

line 55, change ".. and," to --.., and--.

UNITED STATES PATENT AND TRADEMARK OFFICE
CERTIFICATE OF CORRECTION

PATENT NO. : 4,499,496

DATED : February 12, 1985

INVENTOR(S) : NOBUYOSHI TANAKA, ET AL.

It is certified that error appears in the above-identified patent and that said Letters Patent is hereby corrected as shown below:

Column 7: line 13, change "ø3" to --ø13--;

line 23, change "excecuted" to --executed--;

line 30, delete ",";

line 36, delete the comma after "thus";

line 46, change "clok" to --clock--;

line 48, change "are" to --and--;

line 57, change "the" (first occurrence) to --that--.

Column 14: line 8, change "ø12" to --ø12'--;

line 66, change "...," to --and--.

Column 15: line 48, change "in" to --is--.

Column 18: line 61, change "9 10" to --9 or 10--.

UNITED STATES PATENT AND TRADEMARK OFFICE
CERTIFICATE OF CORRECTION

PATENT NO. : 4,499,496

DATED : February 12, 1985

Page 3 of 3

INVENTOR(S) : NOBUYOSHI TANAKA, ET AL.

It is certified that error appears in the above-identified patent and that said Letters Patent is hereby corrected as shown below:

Column 19: line 4, change "stoarge" to --storage--.

Column 20: line 5, change "array" to --arrays--.

Signed and Sealed this

Eleventh Day of February 1986

[SEAL]

Attest:

DONALD J. QUIGG

Attesting Officer

Commissioner of Patents and Trademarks